United States Patent
Wang et al.

(10) Patent No.: US 8,799,686 B2
(45) Date of Patent: Aug. 5, 2014

(54) POWER SUPPLY CIRCUIT FOR SELECTIVELY CONNECTING A DETECTING MODULE TO A SELECTED LOOP CIRCUIT TO DETERMINE A CURRENT OF THE SELECTED LOOP CIRCUIT

(75) Inventors: Chung-Jen Wang, New Taipei (TW); Li-Sheng Shu, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 89 days.

(21) Appl. No.: 13/189,579

(22) Filed: Jul. 25, 2011

(65) Prior Publication Data

US 2012/0303977 A1    Nov. 29, 2012

(30) Foreign Application Priority Data

May 25, 2011    (CN) .......................... 2011 1 0136806

(51) Int. Cl.
*G06F 1/00* (2006.01)
*G05F 1/00* (2006.01)

(52) U.S. Cl.
USPC .......................................... 713/300; 323/282

(58) Field of Classification Search
USPC .......... 713/300, 320, 324, 340; 323/282, 283, 323/265
See application file for complete search history.

(56) References Cited

U.S. PATENT DOCUMENTS

| | | | |
|---|---|---|---|
| 5,818,243 A * | 10/1998 | Wakamatsu | 324/649 |
| 6,356,853 B1 * | 3/2002 | Sullivan | 702/117 |
| 6,448,798 B1 * | 9/2002 | Shinmori | 324/750.3 |
| 6,472,885 B1 * | 10/2002 | Green et al. | 324/638 |
| 6,731,106 B2 * | 5/2004 | Whetsel | 324/750.3 |
| 2003/0141857 A1 * | 7/2003 | Nishida et al. | 323/282 |
| 2004/0148060 A1 * | 7/2004 | Lee | 700/295 |
| 2006/0072273 A1 * | 4/2006 | Hashimoto | 361/93.1 |
| 2007/0135086 A1 * | 6/2007 | Stanford | 455/402 |
| 2007/0192513 A1 * | 8/2007 | Koo | 710/1 |
| 2008/0258556 A1 * | 10/2008 | Ewing et al. | 307/23 |
| 2009/0315583 A1 * | 12/2009 | Rius Vazquez et al. | 324/763 |

* cited by examiner

*Primary Examiner* — Thomas Lee
*Assistant Examiner* — Phil Nguyen
(74) *Attorney, Agent, or Firm* — Novak Druce Connolly Bove + Quigg LLP

(57) ABSTRACT

A power supply circuit includes a voltage converting module, a detecting module, a processor, and a selecting module. The voltage converting module includes at least one output port, each of which is connected to one load circuit to form a loop circuit. The detecting module can be selectively connected to a selected one of the formed loop circuits to detect at least one parameter of the loop circuit. The processor controls the selecting module to connect the detecting module to the selected loop circuit, and further determines the current of the loop circuit according to the at least one parameter.

4 Claims, 2 Drawing Sheets

POWER SUPPLY CIRCUIT FOR SELECTIVELY CONNECTING A DETECTING MODULE TO A SELECTED LOOP CIRCUIT TO DETERMINE A CURRENT OF THE SELECTED LOOP CIRCUIT

BACKGROUND

1. Technical Field

The present disclosure relates to power supply circuits.

2. Description of Related Art

Different load circuits on a printed circuit board (PCB) may need different powers. A power supply circuit on the PCB is used to supply different power to the different load circuits. A work state of the power supply circuit may be detected by detecting voltage values and current values supplied to the different load circuits, and the power supply circuit in a good state will insure that the different circuits are in a good working state. The voltage value of a load circuit may be detected easily, for example, using a multimeter. Meanwhile, the current value of a load circuit is relatively difficult to determine unless interrupting the current work to connect an ampere meter, which may be troublesome.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
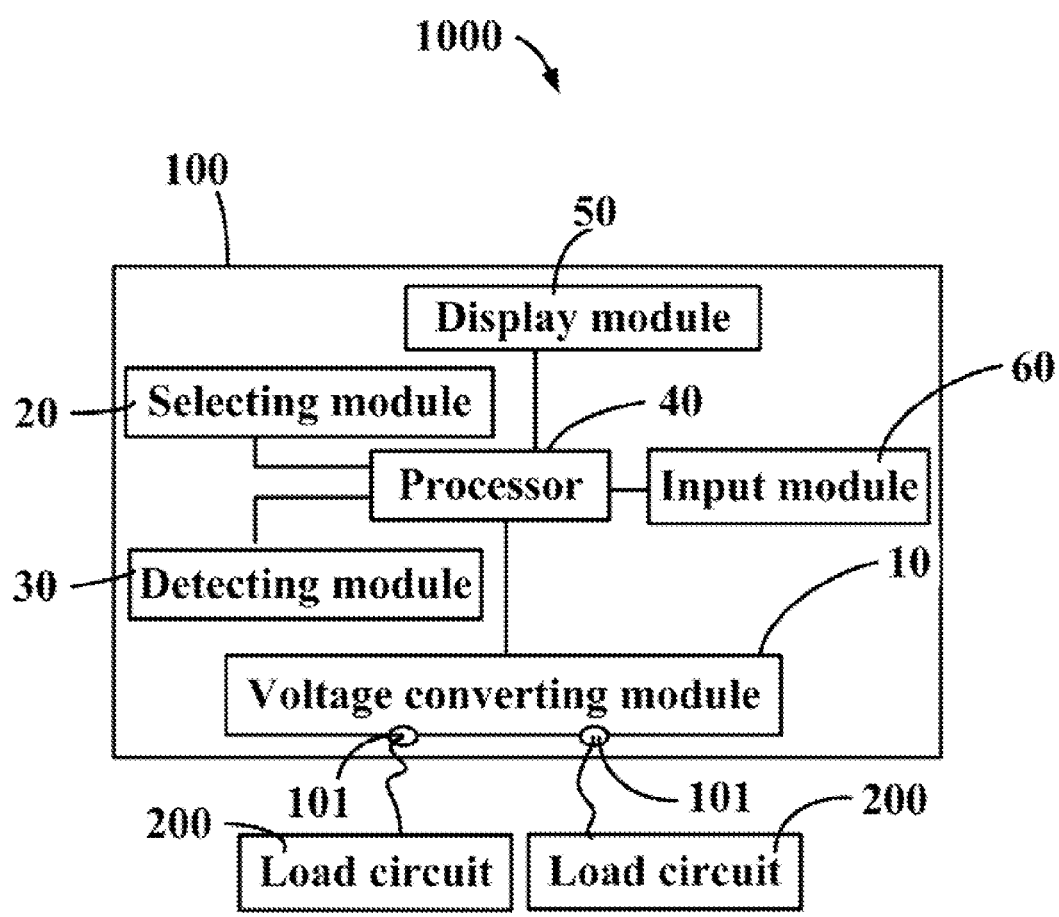
FIG. 1 is a block diagram of a power supply circuit in accordance with an exemplary embodiment.

Referring to FIG. 1, a power supply circuit 100 is arranged on a PCB 1000 to provide power to at least one load circuit 200 on the PCB 1000. The circuit 100 includes a voltage converting module 10. The voltage converting module 10 includes at least one output port 101, each of which is connected to one load circuit 200 to form a loop circuit. The voltage converting module 10 supplies power to each load circuit 200 through the corresponding output port 101. The power supply circuit 100 further includes a selecting module 20, a detecting module 30, and a processor 40. The detecting module 30 can be selectively connected to a selected one of the formed loop circuits to detect at least one parameter of the selected loop circuit. The processor 40 controls the selecting module 20 to connect the detecting module 30 to one loop circuit. The processor 40 further determines the current of the loop circuit according to the at least one parameter of the loop circuit. In this embodiment, the power supply circuit 100 further includes a display module 50. The processor 40 displays the determined current on the display module 50. The power supply circuit 100 further includes an input module 60 to generate different selecting signals for selecting different loop circuits in response to user input. The processor 40 controls the selecting module 20 to connect the detecting module 30 to one loop circuit according to received selecting signal. For example, when the current of one loop circuit needs to be detected, the user selects the loop circuit through the input module 60. The processor 40 controls the selecting module 20 to connect the detecting module 30 to the selected loop circuit according to the selecting signal.

Figure 2:
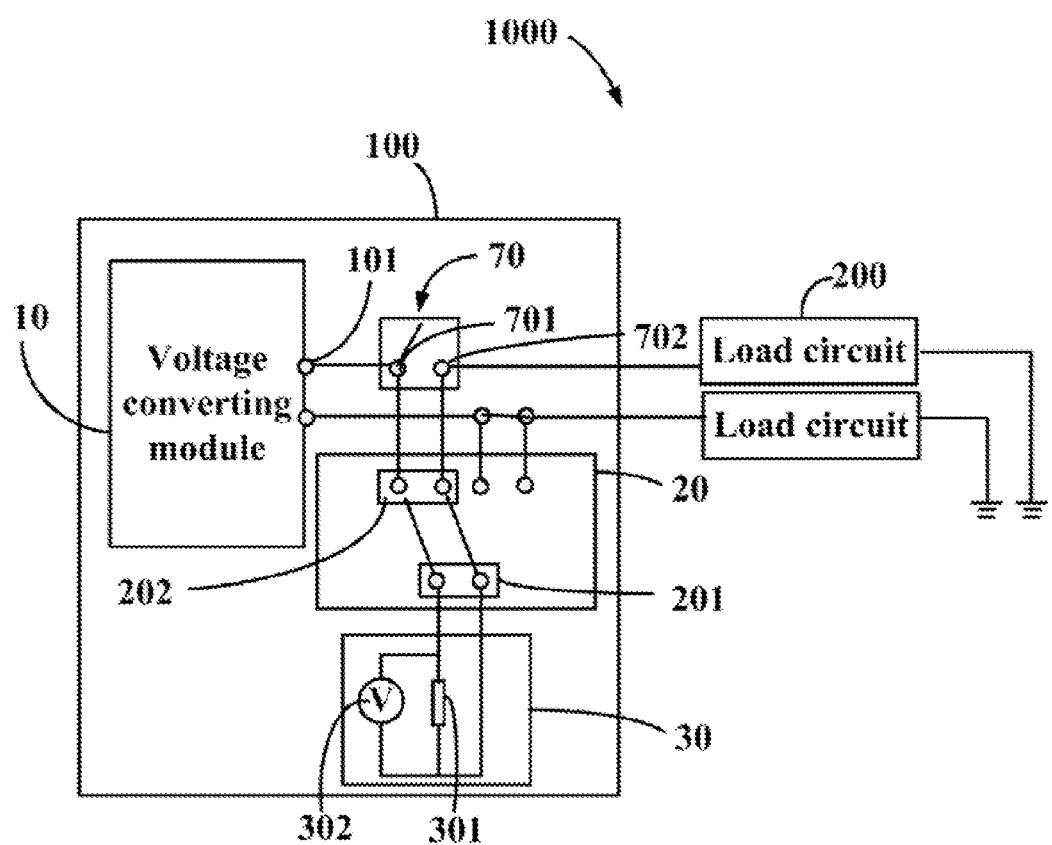
FIG. 2 is a circuit diagram of the power supply circuit of FIG. 1.

Referring to FIG. 2, in this embodiment, the power supply circuit 100 further includes at least one switch 70, each of which includes two ports 701, 702 connected between one output port 101 and one corresponding load circuit 200. The processor 40 turns off or on one switch 70 to open or close one corresponding loop circuit. The selecting module 20 is connected between the detecting module 30 and the at least one switch 70. The selecting module 20 includes a first pair of ports 201 and a number of second pairs of ports 202. Each second pair of ports 202 are respectively connected to the ports 701, 702 of one switch 70. The detecting module 30 is connected between the first pair of ports 201. The selecting module 20 is controlled by the processor 40 to connect the first pair of ports 201 to one second pair of ports 202, connecting the detecting module 30 to one loop circuit. In this embodiment, the detecting module 30 includes a resistor 301 and a voltmeter 302 which are connected in parallel. The resistance of the resistor 301 is far less than the resistance of each load circuit 200. The first pair of ports 201 is respectively connected to two ends of the resistor 301.

When the processor 40 receives one selecting signal from the input module 60, the processor 40 determines the selected loop circuit according to the selecting signal, turns off one switch 70 to open the loop circuit, and controls the first pair of ports 201 to be connected to one second pair of ports 202 corresponding to the switch 70 to connect the detecting module 30 to the loop circuit. The processor 40 further turns on the other switches 70 to close the other loop circuits, thus the voltage converting module 10 can supply power to the other load circuits 200 normally, and also can supply power to the detected load circuit 200 during detecting the current of the load circuit 200.

In this embodiment, the at least one parameter detected by the detecting module 30 is a voltage value U measured by the voltmeter 302. When the first pair of ports 201 is connected to one second pair of ports 202, the resistor 301 is connected to the corresponding load circuit 200 in series. The voltmeter 302 measures the voltage value U of the resistor 301. The resistance value R of the resistor 301 is far less than the resistance of any load circuit 200, thus the resistor 301 has less influence on the current I of the loop circuit, and the current flowing to the resistor 301 is the current I of the loop circuit. In this embodiment, the resistance value R of the resistor 301 is preset in the processor 40, and the processor 40 calculates the current I of the loop circuit according to the formula $I=U/R$.

In an alternative embodiment, the detecting module 30 is an ampere meter. When the detecting module 30 is connected to one loop circuit in series, the detecting module 30 can directly detect the current of the loop circuit.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A power supply circuit comprising:
    a voltage converting module comprising at least one output port each for being connected to a load circuit to form a loop circuit;
    an input module to generate different selecting signals for selecting one of the formed loop circuits in response to user input;
    a detecting module capable of being selectively connected to the selected loop circuit, the detecting module comprising:

a resistor with a resistance value far less than a resistance value of each load circuit; and a voltmeter connected in parallel to measure a voltage value of the resistor;

at least one switch each comprising two ports connected between an output port and a corresponding load circuit;

a selecting module connected between the detecting module and the at least one switch, comprising a first pair of ports and a plurality of second pairs of ports, each second pair of ports correspond to one switch and are connected to the two ports of the corresponding switch, the detecting module connected between the first pair of ports; and a processor to control the selecting module to connect the first pair of ports to one second pair of ports, and turn off or turn on each of the at least one switch to open or close one corresponding loop circuit, thereby connecting the detecting module to the selected loop circuit according to a received selecting signal; and further to determine a current flowing to the resistor according to the voltage value measured by the voltmeter and the resistance value of the resistor preset in the processor, and determine the calculated current as the current of the loop circuit.

2. The power supply circuit as described in claim 1, wherein the first pair of ports is respectively connected to two ends of the resistor.

3. The power supply circuit as described in claim 2, wherein the processor is further to turn on the remaining of the at least one switch to close the other loop circuits, causing the voltage converting module to supply power to the detected load circuit and the other load circuits.

4. The power supply circuit as described in claim 3, wherein the at least one parameter detected by the detecting module is a voltage value measured by the voltmeter.

* * * * *